United States Patent [19]

Haffner

[11] Patent Number: 4,722,591

[45] Date of Patent: Feb. 2, 1988

[54] LASER BEAM COMBINER

[75] Inventor: James L. Haffner, Cincinnati, Ohio

[73] Assignee: Cincinnati Milacron Inc., Cincinnati, Ohio

[21] Appl. No.: 840,238

[22] Filed: Mar. 17, 1986

[51] Int. Cl.$^4$ .................. G02B 27/14; B23K 26/00
[52] U.S. Cl. .................... 350/174; 350/319; 219/121 FS; 219/121 LS
[58] Field of Search ............ 350/174, 166, 602, 622, 350/623, 632, 633, 634, 636, 582, 584, 1.1, 1.6, 1.7, 319; 219/121 FS, 121 LS, 121 LU, 121 LV

[56] References Cited

U.S. PATENT DOCUMENTS 4,402,574  9/1983  McConnel ........................ 350/319
4,532,400  7/1985  Toida et al. .................. 219/121 LS

FOREIGN PATENT DOCUMENTS 156588  9/1984  Japan ........................ 219/121 FS Primary Examiner—Jon W. Henry
Attorney, Agent, or Firm—Thomas M. Farrell

[57] ABSTRACT

A laser beam combiner housing is connected to a light pipe distribution system, and has a first beam path established for a principal lasing beam passing through an inlet aperture to an outlet aperture connected to the light distribution system. An internal mirror face transversely intercepts the first beam path and is aligned with a second laser beam path, so that the second laser beam will establish a line of incidence with the reflective mirror, and the corresponding line of reflection of said second laser beam will be collinear with the first laser beam path. The second laser beam is created by a low power visible spectrum laser generating unit, so that the light distribution pipes and corresponding reflective mirrors may be accurately aligned with the principal lasing beam path. The housing is also provided with cooling fluid to create controlled environment for the principal lasing beam.

6 Claims, 3 Drawing Figures

LASER BEAM COMBINER

BACKGROUND OF THE INVENTION

The invention relates to laser beam distribution systems, and in particular, the invention relates to laser systems where it is desirable to align the laser distribution tubes and mirrors by means of a low power, visible laser beam.

In a laser beam distribution system which generally originates at the outlet of a laser generator, it is necessary to align the laser distribution conduits, generally referred to as "light pipes" and reflective joint mirrors linking the light pipes. Many systems of short length can be aligned by simple measurement and placement of light pipes, but, for complicated and long distance, it is desirable to align the system by means of a lower power visible laser beam such as that provided by a helium-neon laser (HeNe).

Frequently, the HeNe laser is the heart of a system, as in certain measuring systems, but, where the principal lasing unit forms an invisible beam, such as that found in a $CO_2$ laser, and, where certain high power (1.5 kw) lasers may have an unfocused beam diamter of ⅜ inch, for example, it is necessary to very accurately align the central, principal lasing beam with the light pipe system, by means of other than the principal lasing beam.

Applicant has devised a compact, reliable system for aligning a laser beam in a light pipe system, and, as a subset, the device provides convenient means for introducing cooling, or otherwise conditioned, fluid to establish a controlled environment for the lasing beam.

It is therefore, an object of the present invention to provide a compact system for aligning a principal lasing beam with a light distribution system by means of an auxiliary lasing beam unit.

Another object of the present invention is to provide a laser entry box having a conditioned fluid introduced therein to provide a controlled environment for a laser beam distribution system.

SUMMARY OF THE INVENTION

The invention is shown embodied in a laser beam combiner wherein a box-like housing has a principal laser beam inlet aperture aligned with a laser outlet aperture to define a first laser beam path, and a second laser beam inlet aperture is located in the housing transversely to the first laser beam path. A laser mirror is mounted in said housing, the mirror having a reflective face obliquely intercepting the first laser beam path and the face is angled with respect to the second laser beam inlet aperture to define a second nonlinear laser beam path comprising a line of instance and a line of reflection with respect to the laser mirror, the line of reflection being colinear with at least a portion of the first laser beam path through the laser outlet aperture. A principal lasing beam, for example a $CO_2$ laser beam, is aligned with the first laser beam path through the housing, and a secondary, low power laser beam, in the visible spectrum is aligned with the second laser beam path to provide a reference for aligning the light pipe distribution system and accompaying reflective mirrors.

DESCRIPTION OF THE PREFERRED EMBODIMENT

GENERAL DESCRIPTION OF THE ROBOT

Figure 1:
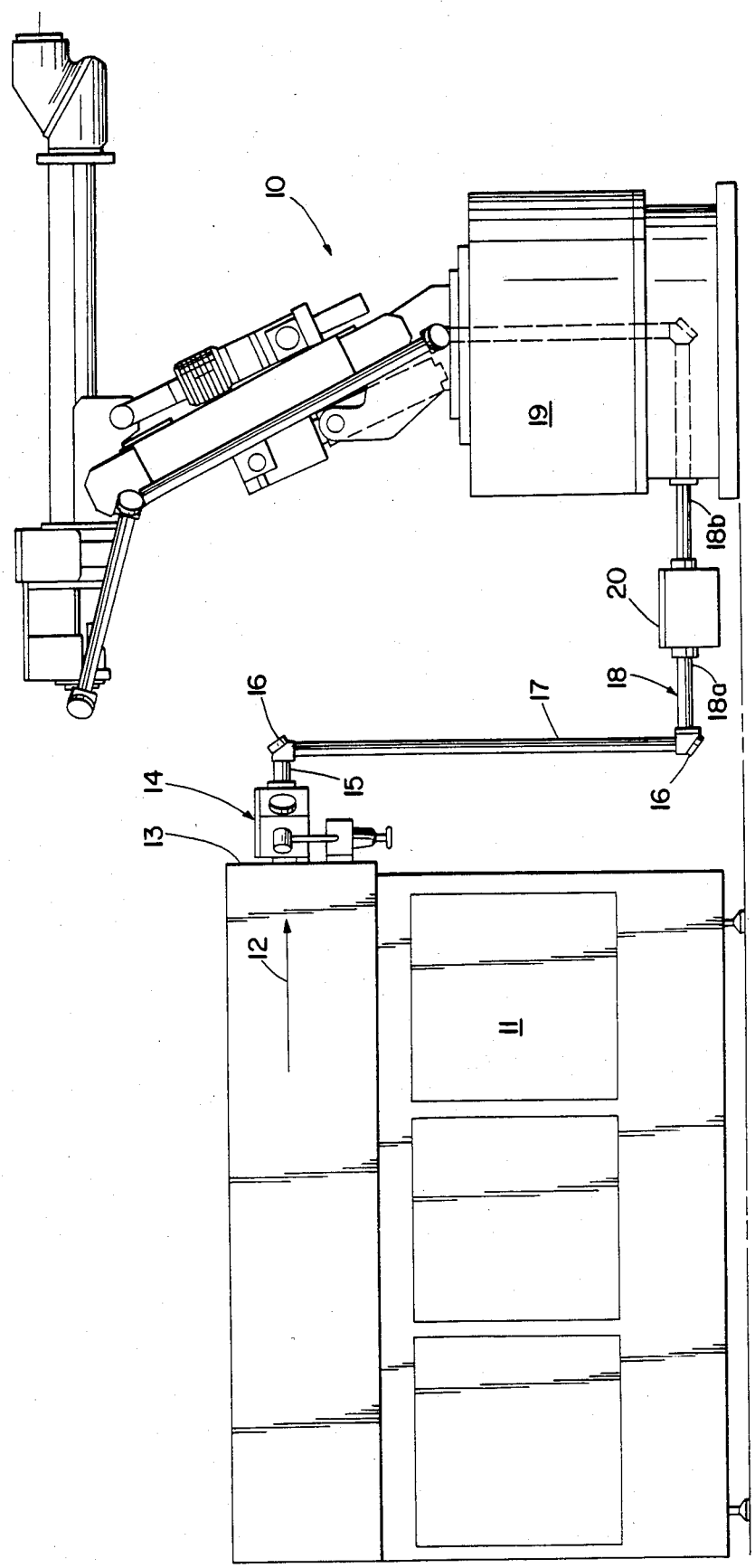
FIG. 1 is a side elevational view of a laser robotic system.

FIG. 1 of the drawings illustrate a right side elevational view of a laser robot 10 having a laser generating unit 11 mounted on a floor nearly. The laser unit 11 may be any of a variety of industrial lasing units manufactured by companies such as Coherent General Company, Spectra-Physics, etc. The preferred laser unit 11 for many power applications is an invisible $CO_2$ gas laser, emitting a laser beam 12 along a horizontal path from the exit end 13 of the unit 11. The beam 12 is directed into a beam combiner 14, exiting through a light pipe 15 which is a hollow tube connected to the beam combiner 14 and to a path-direction changing unit such as the corner mirror assembly 16 shown. The beam combiner 14 will be fully discussed in conjunction with FIGS. 2 and 3, to describe how the robot is cooled and how the beam 12 is aligned. The mirror assembly 16 directs the beam 12 downward along a vertical path through a light pipe 17 to a second mirror assembly 16 which redirects the beam 12 along a horizontal path through a light tube 18 into a base 19 of the robot 10. The light pipe 18 may be continuous in many applications, but for the preferred embodiment the pipe 18 may be replaced by two pipe sections 18a,b, with a beam switching box 20 located therebetween. The switching box 20 does not form a part of the present invention.

Laser Entry Box

Figure 2:
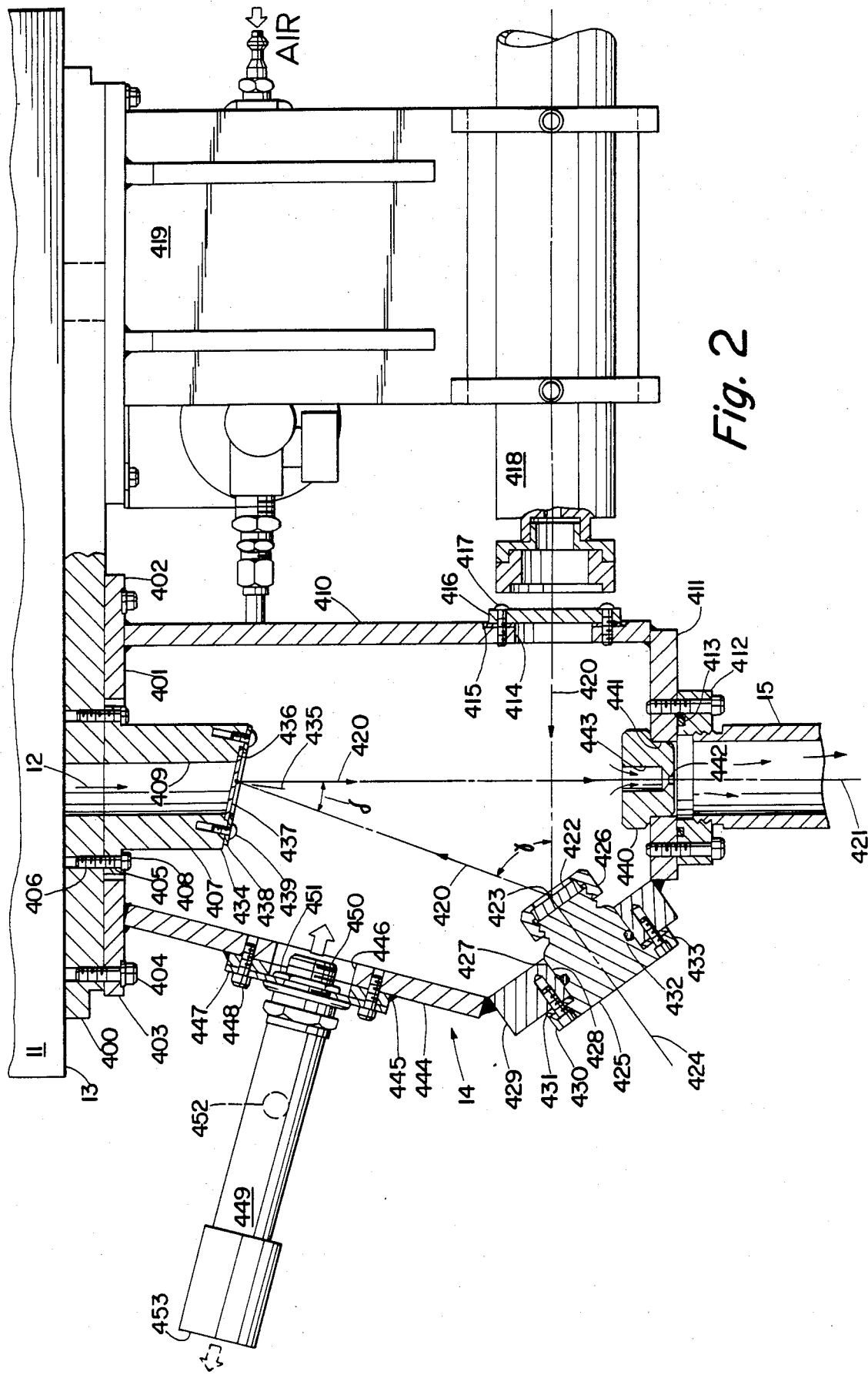
FIG. 2 is a plan section through the laser beam combiner taken along the line 2—2 of FIG. 1.
Figure 3:
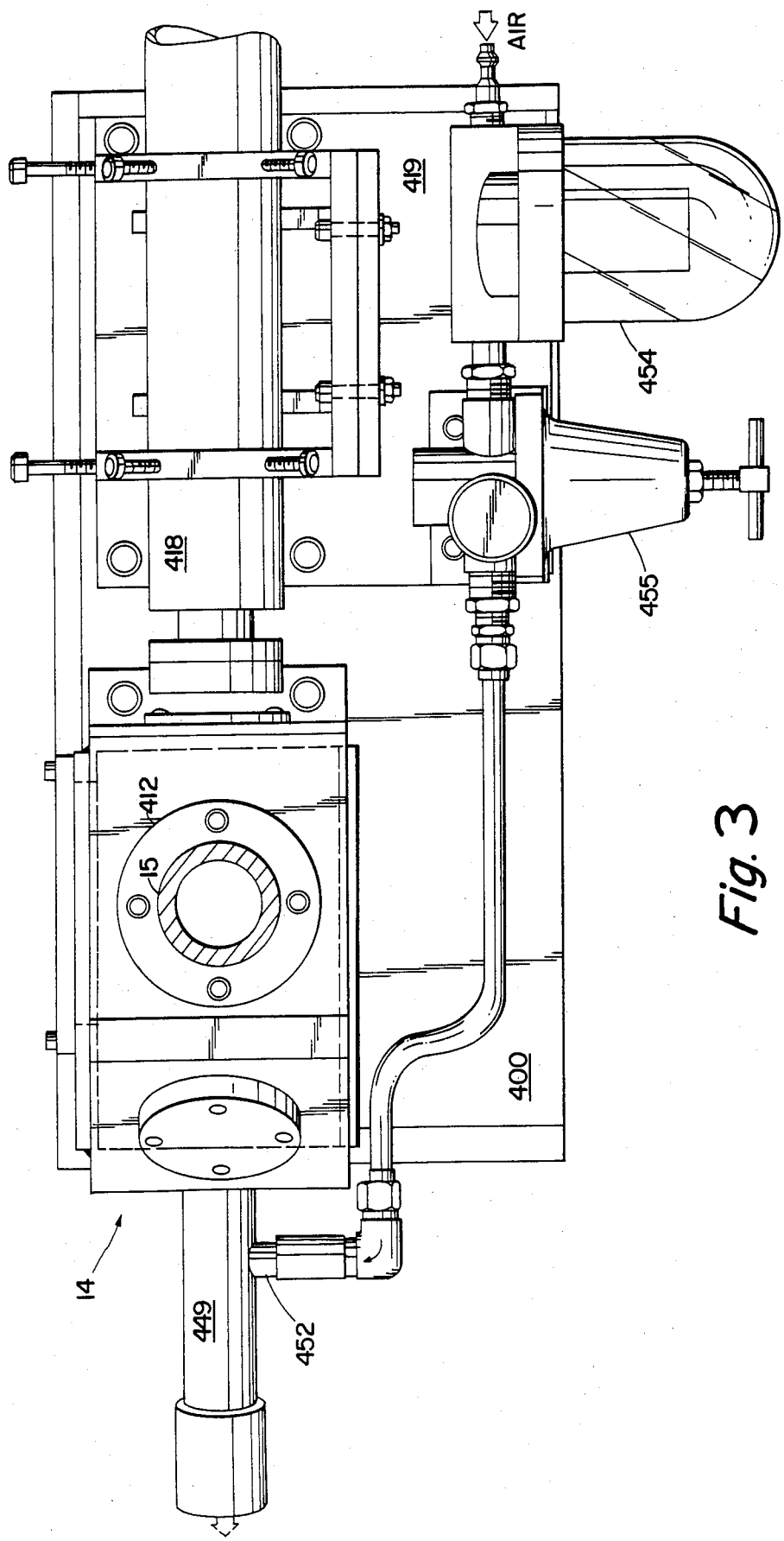
FIG. 3 is a front elevational view of the laser beam combiner, taken along the line 3—3 of FIG. 1.

Referring to the plan section of FIG. 2 and the front view of FIG. 3 together, the laser beam combiner 14 of FIG. 1 is shown affixed to a mounting plate 400 mounted to the front, or exit end 13 of the laser generator unit 11. The beam combiner 14 is of welded construction, having a baseplate 401 extending past side flanges 402,403 secured by cap screws 404. The baseplate 401 has a central horizontal hole 405 with clearance around the flange 406 of a laser entry tube 407, flange-mounted with screws 408 against the baseplate 400. The tube 407 has a central bore 409 for the passage of the high power laser beam 12 emanating from the laser generator unit 11. The beam combiner 14 has a side plate 410 extending parallel to the laser beam 12, and an end plate 411 is aligned at 90° to the side plate 410. The end plate 411 has a threaded collar 412 secured thereto, sealed with an O-ring 413, and the first light pipe 15 is threadably received in the collar 412. The side plate 410 has a hole 414 and spot face 415 covered by a transparent window 416 which is gasketed and held in position with buttonhead screws 417. A relatively low-power laser generator unit 418—for example, a helium neon (HeNe) laser, which emits a red visible light beam—is mounted at 90° to the side plate 410 on a mounting bracket 419 fastened to the mounting plate 400.

The laser unit 418 is aligned so that the incoming beam 420 will form a right triangle with the axis 421 of the light pipe 15. In order to do so, a base angle alpha is selected, and the apex angle delta would then be 90° minus alpha. A reflecting mirror 422 is positioned at the base corner 423 of the triangle, normal to a line 424 bisecting angle alpha. The mirror 422 is held against the end of a positioning plug 425 by a retaining cap 426 threadably received on the plug 425. The positioning plug 425 has a pilot 427 received in a close-fitting bore 428 in a thick, angled side wall 429 of the box 14, and a flange 430 is received against a fitting washer 431 to adjustably position the mirror 423. The pilot 427 is sealed with an O-ring 432, and the plug 425 is held in position by cap screws 433 received through the flange 430. The end 434 of the laser entry tube 407 is machined flat, normal to a line 435 bisecting angle delta, and a shallow counterbore 436 in the surface 434 receives a reflecting mirror 437 which is retained by a retaining ring 438 and screws 439. The mirror 437 is made of a material such as gallium arsenide (GaAs), or zince selenide (ZnSe), which is transparent to the working ($CO_2$) beam, but partially relfective to the alignment (HeNe) beam—due to the difference in wavelength of the two beams. In order to assure that the low power, visible laser beam 420 is centered coaxially with the axis 421 of the light pipe 15, a tooling plug 440 is inserted to a close-fitting bore 441 in the end plate 411 of the box 14. The plug 440 has a knurled outer diameter and has a small centered aperture 442 and a counter-drilled clearance hole 443. When the laser 418 is positioned correctly, the visible beam 420 will pass through the aperture 442. This beam 420 is utilized for aligning the various mirrors on the robot 10, since the higher-power main laser beam 12 is invisible to the eye. After aligning the laser components, the tooling plug 440 is removed, and the low-power laser unit 418 may, optionally, be turned off, or left on to track the larger-diameter, high-power beam 12. The entry box 14 has an additional side plate 444 enclosing the structure, having a welded circular flange 445 and a clearance hole 446 therethrough. A thin mounting plate 447 is gasketed and secured to the flange 445 by cap screws 448, and the mounting plate 447, in turn, supports a vortex tube 449 by means of a threaded end 450 passing through the plate 447 and secured with a locknut 451. The vortex tube 449 is of the type available from the Vortec Company, Cincinnati, Ohio, wherein compressed air enters through a side inlet 452 at a first reference temperature. Through a vortex/spinning action, cold air will exit one tube end 450 and hot air will exit the other end 453. The cold air flows through the box 14 and down through the light pipe 15 to cool the various laser components and to slightly pressurize the system so as to prevent the entry of airborne contaminants from the atmosphere. The laser mounting bracket 419 also carries an air filter 454 and pressure regulator 455 tubed in series with the vortex tube 449 to regulate and clean the air received from an air pressure source (not shown).

It will be appreciated by those skilled in the art that the device may be provided with cooling fluids other than air, for example, inert, low cost, gaseous nitrogen.

While the invention has been shown in connection with a preferred embodiment, it is not intended that the invention be so limited. Rather, the invention extends to all such designs and modifications as come within the scope of the appended claims.

What is claimed is:

1. A laser beam combiner, comprising:
   (a) a box-like housing including
      a first laser inlet aperture and
      a laser outlet aperture defining a linear first beam path; and
      a second laser inlet aperture located about an axis angled to said first beam path;
   (b) a laser mirror mounted in said housing, including
      a front reflective face obliquely intercepting said first beam path and angled with respect to said axis to define
      a non-linear second beam path, said second beam path comprising a line of incidence and a line of reflection, said line of incidence collinear with said axis and said line of reflection collinear with said first beam path through said laser outlet aperture; and
   (c) a tooling plug, removably located centrally within said laser outlet aperture, said plug having a central hole substantially smaller than said laser outlet aperture.

2. The laser beam combiner of claim 1, wherein said first laser inlet aperture and said laser outlet aperture are in line with one another, and said mirror has a rear face and mirror means for passing a laser beam through said mirror from said rear face to said front reflective face.

3. The laser entry box of claim 1, wherein said housing includes means for supplying a conditional environment fluid to the interior of said housing, said fluid being freely ducted from said housing through said laser outlet aperture.

4. The laser beam combiner of claim 3, wherein said fluid is a cooling gas.

5. The laser beam combiner of claim 1, further comprising first and second laser beams corresponding to said first and second laser inlet apertures, said second laser beam comprising laser light in the visible spectrum.

6. The laser beam combiner of claim 1, further comprising a second mirror mounted in said housing, said second mirror located with respect to said second laser inlet aperture and said laser mirror so that said second laser beam path is coextensive with a line of incidence and a line of reflection of said second mirror, and said line of incidence of said laser mirror is collinear with said line of reflection of said second mirror.

* * * * *